H. L. McCOY.
CUTTING SPOON.
APPLICATION FILED NOV. 23, 1907.

904,553.

Patented Nov. 24, 1908.

Witnesses:
L. L. Simpson
A. H. Opsahl

Inventor:
Harry L. McCoy
By his Attorneys:
Williamson & Merchant

UNITED STATES PATENT OFFICE.

HARRY L. McCOY, OF MINNEAPOLIS, MINNESOTA.

CUTTING-SPOON.

No. 904,553.  Specification of Letters Patent.  Patented Nov. 24, 1908.

Application filed November 23, 1907. Serial No. 403,491.

*To all whom it may concern:*

Be it known that I, HARRY L. McCOY, a citizen of the United States, residing at Minneapolis, in the county of Hennepin and State of Minnesota, have invented certain new and useful Improvements in Cutting-Spoons; and I do hereby declare the following to be a full, clear, and exact description of the invention, such as will enable others skilled in the art to which it appertains to make and use the same.

My invention has for its object to provide an improved cutting spoon, and to this end, it consists of the novel construction and arrangement of parts hereinafter described and defined in the claims.

The invention is illustrated in the accompanying drawings, wherein like characters indicate like parts throughout the several views.

Figure 1:
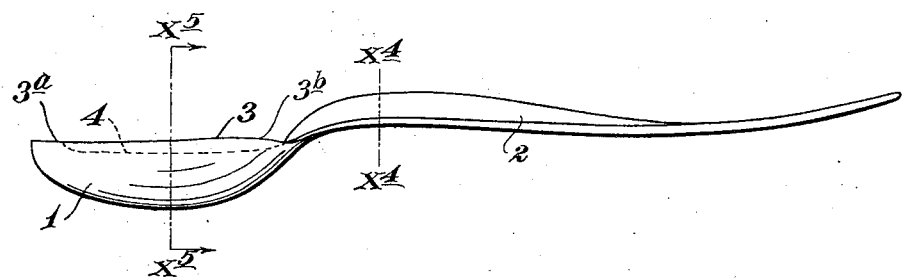
Figure 2:
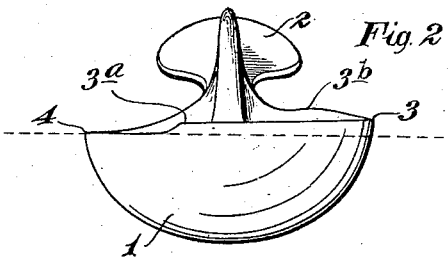
Figure 4:
Figure 3:
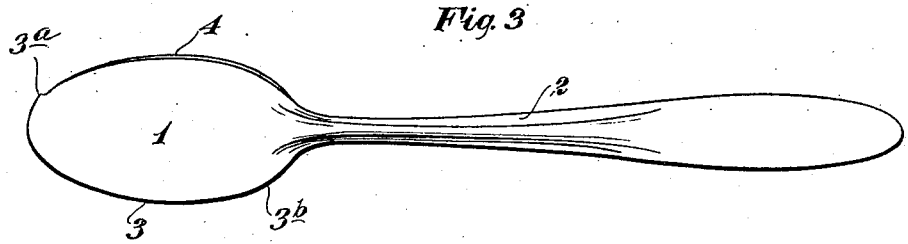
Figure 5:
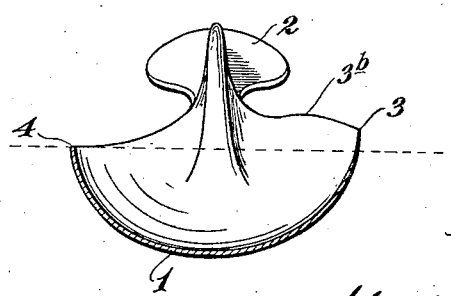

Referring to the drawings; Figure 1 is a view in side elevation showing the improved cutting spoon. Fig. 2 is a view in end elevation, looking at the bowl end of the spoon. Fig. 3 is a plan view of the improved spoon. Fig. 4 is a section taken on the line $x^4 x^4$ of Fig. 1; and Fig. 5 is a transverse section taken on the line $x^5 x^5$ of Fig. 1.

The spoon bowl 1 is preferably formed integral with a handle 2, said parts being stamped into the desired form. The bowl 1 is formed deep, and at one side it is formed with a sharp cutting edge 3 that runs around the end of the bowl. This entire cutting edge 3 is raised and brought into the plane that is above the horizontal plane of the dull edge 4 of the spoon. By raising the cutting edge, a butter-cutting action is afforded; and, furthermore, this raised edge may be repeatedly sharpened and thus gradually worn down without destroying the bowl or making the same inoperative for use as an ordinary spoon or ladle.

In the preferred arrangement, the cutting edge 3, where it joins the end of the bowl, has quite a sharp angular portion $3^a$, by means of which eyes may be cut out of potatoes, and similar work readily accomplished. Also the sharp edge 4, near the point where it joins with the handle of the spoon, has an abrupt curve or angular portion $3^b$ which makes the initial cut into the vegetables, or other articles, an easy matter.

The handle is preferably made channel-shaped, as best shown in Fig. 4, to give the same the desired strength with a small amount of metal.

The term "spoon" is herein used in a broad sense, and it will be understood that the spoon may be made in different sizes, and when made large, might be designated as a ladle. It may be stamped either from brass, steel, or other metal, and may be plated with nickel, silver, or any other suitable material; and may, when desired, be made into ornamental designs.

A spoon of the kind described will be found convenient for a great many different uses. In cutting cabbage and various other vegetables, and serving such vegetables at the table, it will serve both as a knife and a spoon or ladle. The spoon will also be found serviceable for many other uses.

What I claim is:—

1. A spoon or ladle having the bowl 1 formed with a dull edge 4 and cutting edge 3, which cutting edge from one extremity to the other is raised into a plane materially above the horizontal plane of the dull edge 4 of said bowl thereof, and along one side and the end of the bowl, substantially as described.

2. A spoon or ladle having a bowl formed with a dull edge 4 and cutting edge 3, which cutting edge is raised into a plane materially above the horizontal plane of the dull edge 4, and is provided with a sharp angular portion $3^a$ adjacent to the point where the said raised cutting edge joins the dull edge 4 at the end of the spoon, substantially as described.

In testimony whereof I affix my signature in presence of two witnesses.

HARRY L. McCOY.

Witnesses:
 H. D. KILGORE,
 MALIE HOEL.